US005934520A

United States Patent [19]

[11] Patent Number: 5,934,520

[45] Date of Patent: Aug. 10, 1999

Byerly et al.

[54] LIQUID DISPENSING DEVICE

[75] Inventors: David J. Byerly, Lawrenceville, Ga.; David Creg, South Amherst, Ohio; Charles P. Ganzer, Cumming, Ga.; Thomas C. Jenkins, Amherst, Ohio; Sidney K. Sooudi, Alpharetta, Ga.

[73] Assignee: Nordson Corporation, Westlake, Ohio

[21] Appl. No.: 08/963,374

[22] Filed: Nov. 3, 1997

[51] Int. Cl.[6] .............................. B67D 3/00; B65D 47/00; F16K 31/00

[52] U.S. Cl. .......................... 222/504; 222/559; 222/325; 251/359

[58] Field of Search ..................................... 222/149, 504, 222/559, 325; 251/356, 359

[56] References Cited

U.S. PATENT DOCUMENTS

| | | | |
|---|---|---|---|
| Re. 27,865 | 1/1974 | Baker et al. | 222/504 |
| 3,840,158 | 10/1974 | Baker et al. | 222/487 |
| 4,066,188 | 1/1978 | Scholl et al. | 222/146 |
| 4,295,573 | 10/1981 | Terry et al. | 215/348 |
| 4,334,637 | 6/1982 | Baker et al. | 222/146 |
| 4,465,212 | 8/1984 | Boone | 222/504 |
| 4,579,255 | 4/1986 | Frates et al. | 222/149 |
| 4,801,051 | 1/1989 | Lewis et al. | 222/309 |
| 4,989,792 | 2/1991 | Claassen | 239/586 |
| 5,207,352 | 5/1993 | Porter et al. | 222/1 |
| 5,277,344 | 1/1994 | Jenkins | 222/504 |
| 5,292,068 | 3/1994 | Raterman et al. | 239/11 |
| 5,447,254 | 9/1995 | Hoover et al. | 222/1 |
| 5,535,919 | 7/1996 | Ganzer et al. | 222/1 |
| 5,598,974 | 2/1997 | Lewis et al. | 239/135 |
| 5,794,825 | 8/1998 | Gordon et al. | 222/504 |

FOREIGN PATENT DOCUMENTS

| | | |
|---|---|---|
| 0790080 | 8/1997 | European Pat. Off. . |
| 43132161 | 10/1993 | Germany . |

OTHER PUBLICATIONS

Nordson Corporation, H–200 Series Modular Hot Melt Guns, Product Information, 1981, 2 pages.

Mercer Corporation, Low Profile Heads featuring Quick-change "Repairable" Screw–in Cartridges, 1982, 7 pages.

Nordson Corporation, Module, H2000, Adjustable, 272282, Drawing, 1980.

Vertriebs–und Entwicklungsgesellschaft mbH, UES® Klebetechnik, Beschreibung der Modulserie H–300, Leaflet (undated), 4 pages.

Nordson Corporation, H–201 Zero Cavity Gun, Product Information, 1985, 2 pages.

Nordson Corporation, Drop–In Cartridge Hot Melt Gun Model AD–24, Marketing Communications Bulletin, 1973, 2 pages.

*Primary Examiner*—Andres Kashnikow
*Assistant Examiner*—Keats Quinalty
*Attorney, Agent, or Firm*—Wood, Herron & Evans, L.L.P.

[57] ABSTRACT

A liquid dispensing device including a body generally having an air passage and a liquid passage. A valve seat element is connected to the body and a needle is mounted for movement within the body with respect to the valve seat element. First and second connected needle guides receive respective portions of the needle in a manner inhibiting sideward movement thereof. The first needle guide allows flow of liquid through the liquid passage adjacent the first needle guide to the dispensing orifice when the needle is moved away from the valve seat. The first needle guide is connected to the valve seat by way of a press fit and is connected to a second needle guide by way of another press fit. The connected needle guides are likewise press fit into a bore in the body. These connections all aid in maintaining close tolerances and excellent alignment of the needle. A liquid seal is generally disposed between the first and second needle guides and prevents liquid from entering the air passage. The needle may be moved by pressurized air acting against a piston and the needle may be normally closed by a spring return mechanism when the pressurized air has been shut off. A pivotal force transfer element associated with the spring return mechanism reduces side load on the needle.

43 Claims, 4 Drawing Sheets

LIQUID DISPENSING DEVICE

FIELD OF THE INVENTION

This invention generally relates to liquid dispensing devices used for a variety of purposes, but particularly useful for viscous liquids such as hot melt adhesives, sealing compounds, paints, etc. Such devices may be referred to as fluid control valves or dispensing guns or modules. More specifically, the present invention relates to a liquid dispensing device having improved features related to increasing reliability and decreasing costs associated with manufacturing, maintenance and replacement.

BACKGROUND OF THE INVENTION

A typical dispensing device for supplying liquid, such as hot melt adhesive, generally includes a body having a valve that opens and closes a dispensing orifice. The valve is usually operated by pressurized air to dispense discrete amounts of pressurized liquid. One or more liquid seals within the device prevent the migration of liquid between the liquid and air passages of the device.

Devices generally related to the present invention include a liquid passage adjacent the dispensing orifice and an air passage or chamber at an opposite end of the device. The air passage contains a piston connected to a valve stem or pin on one side and may include a spring on the other side. Under sufficient air pressure, the piston and valve stem or pin may be moved in a direction away from the valve seat to discharge liquid. When the air pressure on one side of the piston is relieved, the spring will automatically return the pin to a normally closed position against the valve seat. Air pressure may also be used to close the valve stem or pin. The spring generally includes an adjustment to vary its compression and thereby vary the amount of air pressure required to open the valve. Adjustment of the spring compression will also adjust the biasing force used to close the valve. These devices may also include a stroke adjustment, or the spring adjustment may also vary the stroke of the valve stem or pin to adjust the flow rate.

Despite the wide success of devices as described above, continuing problems exist. For example, devices or modules of the same design may have various stroke lengths simply due to the stack up of internal parts which each have a range of dimensional tolerances. In addition, the valve stem or pin may be insufficiently supported against sideward movement and this may lead to increased wear of the various seals used around the pin. Existing dispensers have also required machining from both ends of the dispenser body. For this reason, different machining setups are required to form the same dispenser body. This leads to the potential for inaccurate alignment of the various bores and parts within the dispenser body. The number of parts required to assemble past dispenser modules or devices has also been relatively high and this increases parts and manufacturing costs. Finally, typical modules have included a rigidly connected or integrally formed flange on the end of the pin bearing against the return spring. This increases the possibility that side load is exerted on the pin by the spring and, again, this may lead to increased seal wear.

It would therefore be desirable to provide a dispenser module or device that may be readily substituted within applications currently utilizing existing dispensing devices or modules, but having various improvements eliminating or reducing problems such as those mentioned above.

SUMMARY OF THE INVENTION

The present invention therefore generally provides a liquid dispensing device having a body with a liquid passage. A valve seat element having a valve seat and a dispensing orifice is operatively connected with the body. A needle is mounted for movement within the body to open and close the dispensing orifice. In accordance with the invention, first and second needle guides have guide portions that receive respective portions of the needle in a manner inhibiting sideward movement thereof. The first needle guide is connected to the valve seat element and is formed to allow flow of liquid through the liquid passage to the dispensing orifice when the needle is moved away from the valve seat. The second needle guide is connected to the first needle guide. This general combination of elements allows the valve stem or pin to be supported against undesirable sideward movement along a greater length than past or existing dispensing devices or modules, while retaining the same or similar overall dimensions and therefore allowing easy interchangeability.

Although other forms of the first needle guide are contemplated and within the scope of this invention, the first needle guide is preferably formed to provide a liquid flow path adjacent an outer surface thereof. This may be accomplished by providing an outer surface of the first needle guide which is discontinuous with respect to an adjacent surface of the second needle guide and, even more specifically, may be the result of using a first needle guide having at least one flat outer surface opposed to an inner wall of the second needle guide which is not flat and, preferably, which is circular. In the preferred embodiment, the first needle guide is generally triangular in cross-section while an internal receiving portion of the second needle guide is circular in cross-section.

A friction fit or press fit is preferably used between the first needle guide and the valve seat element at one end and the first and second needle guides at the other end. This also helps accurately align the various elements within the body along a single axis, i.e., the needle axis. Preferably, a liquid seal is disposed around the needle adjacent the guide portion of the second needle guide for preventing liquid from entering the air passage. The liquid seal may be disposed generally midway between the first and second needle guides. In this manner, if the needle experiences any bending or side movement, the effect will be lowest at the liquid seal. Preferably, the first needle guide retains the liquid seal within a space in the second needle guide. The liquid and air seals of the device are preferably formed from polyetheretherketone (PEEK) as this material has been found to have excellent machinability and may be formed with sharp scraping edges. The second needle guide further includes at least one weep hole for receiving liquid leaking past the liquid seal.

The needle is preferably connected to a spring return mechanism including a return spring for maintaining the needle in a normally closed position. In the preferred embodiment, air pressure may alternatively or additionally be used to maintain the needle in a closed position. In these cases, a force transfer element may bear against the piston or it could additionally or alternatively bear against an end of the needle. Also, the force transfer element may be eliminated and a piston stop may be used that provides for air flow to the piston.

In one embodiment, the force transfer element takes the form of a pivotal needle load button disposed between an end of the needle and the return spring to transfer the spring force to the needle. The needle load button is free to pivot with respect to the longitudinal axis of the needle to help direct the spring force along the needle axis and thereby reduce side load on the needle.

In another preferred feature, at least one of the valve seat element and the body includes structure that inhibits rotation of the valve seat element with respect to the body but allows axial movement of the valve seat element into and out of the body for assembly and disassembly purposes. The valve seat element is therefore easily assembled with the body and dispensing nozzles may be threaded onto and off of the valve seat element without causing the valve seat element to rotate. Preferably, the body includes a multi-sided hole for receiving the valve seat element and the valve seat element includes a surface engaging the multi-sided hole to inhibit relative rotation between the valve seat element and the body.

As another aspect of this invention, at least one mounting fastener is disposed through the body and located with respect to the second needle guide to act as a fail safe stop for preventing movement of the second needle guide in a direction away from the valve seat element under excessive liquid pressure.

As an additional aspect of this invention, a cartridge assembly may be provided including the valve seat element, first needle guide and second needle guide as generally described above. This cartridge assembly may be used, for example, within existing manifolds or dispensing devices having the requisite valve and actuating structure already in place.

A novel method is provided for permanently or semi-permanently setting a stroke length for the device. Generally, the method includes the steps of: moving the needle against the valve seat; moving a stop element of the spring return mechanism toward the needle until the needle prevents further movement; moving the stop element away from the needle by a predetermined distance; and rigidly fixing the stop element relative to the body. Specifically, the stop element is a sleeve associated with the spring return mechanism and this sleeve contacts the pivotal force transfer element disposed between the sleeve and the needle. The stroke length is preferably rigidly set by crimping or otherwise deforming the body into the sleeve. This method alleviates the problem of producing a variable stroke length from device to device during assembly due to the stack up of parts having varying dimensions.

These and other objects, advantages and features of the invention will become more readily apparent to those of ordinary skill in the art upon review of the following detailed description of the preferred embodiment taken in conjunction with the accompanying drawings.

DETAILED DESCRIPTION OF THE PREFERRED EMBODIMENTS

Figure 1:
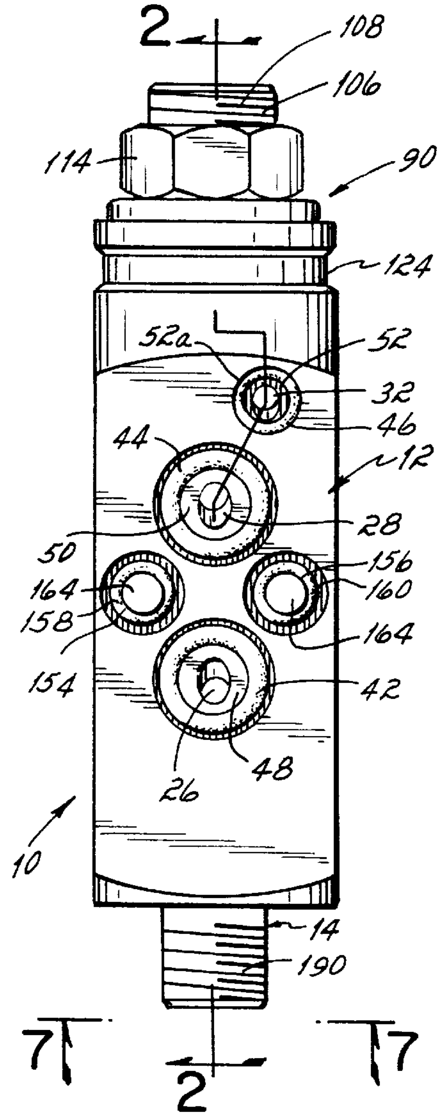
FIG. 1 is an elevated rear view of a dispensing device constructed in accordance with a preferred embodiment of the present invention.
Figure 3:
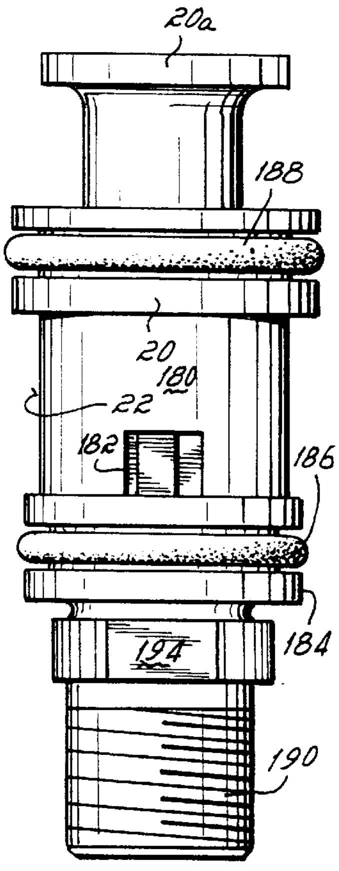
FIG. 3 is an elevated view of an internal cartridge assembly of the device shown in FIGS. 1 and 2.
Figure 2:
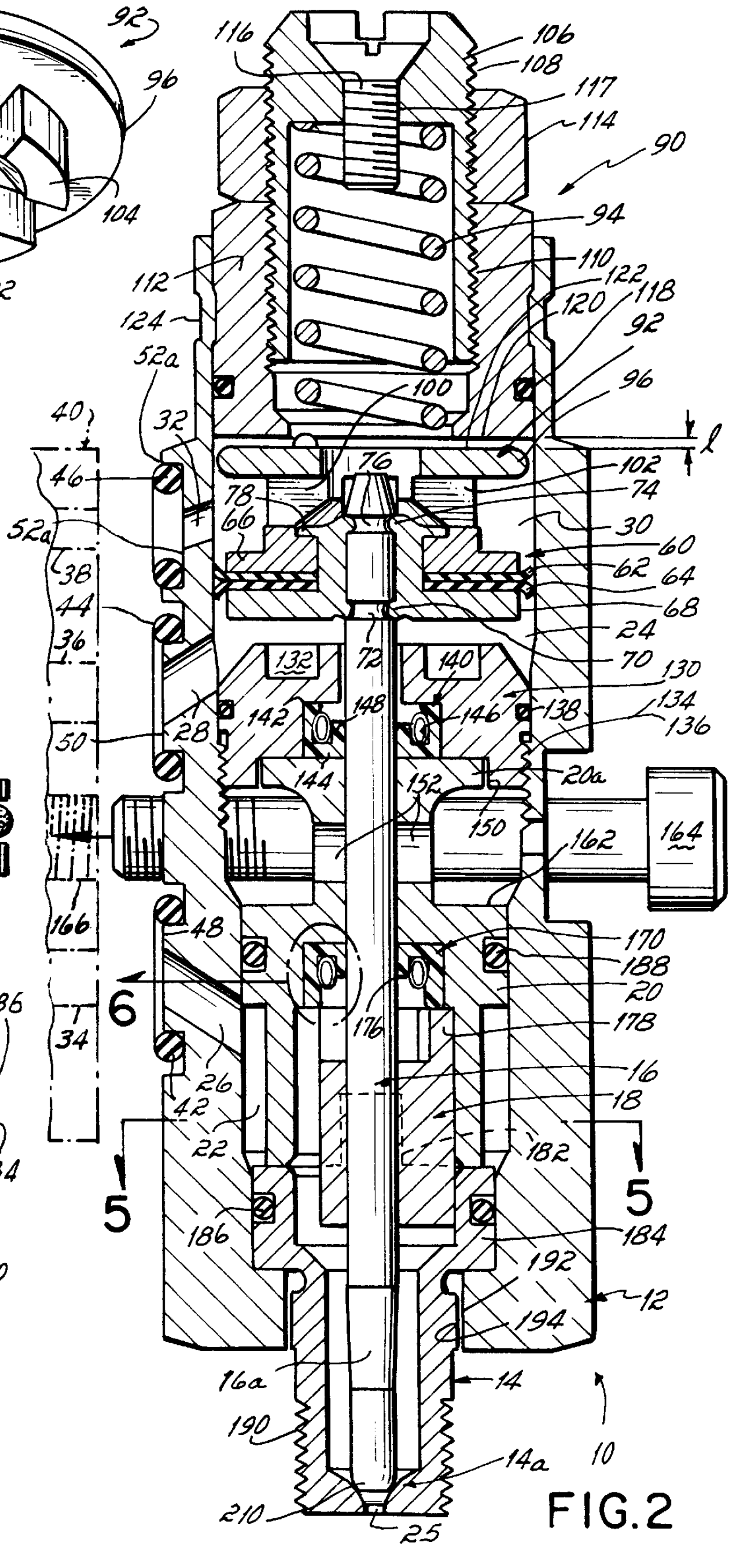
FIG. 2 is a sectional view of the device shown in FIG. 1 and taken generally along line 2—2 thereof.

Referring to FIGS. 1–3, the dispensing device 10 of the preferred embodiment includes a body 12, a valve seat element 14, and a needle 16 mounted for reciprocating movement within body 12. Needle 16 forms a valve with valve seat 14*a* of valve seat element 14. Needle 16 also includes a section 16*a* tapered at about 1° to allow for easier assembly of device 10. Body 12 is preferably formed from aluminum while valve seat element 14 and needle 16 are preferably formed respectively from 303 stainless steel and heat treated 52100 stainless steel. As further shown in FIG. 2, device 10 includes a first needle guide 18 and a second needle guide 20 for receiving portions of needle 16 to inhibit sideward movement thereof. Preferably, needle guides 18 and 20 are formed of brass and have through holes receiving needle 16 each preferably with a 0.001 inch total clearance.

As shown best in FIG. 2, body 12 generally includes a liquid passage 22 and an air passage 24. Liquid passage extends into valve seat element 14 through needle guides 18, 20. Liquid passage 22 therefore allows liquid to flow into valve seat element 14 and ultimately to an outlet orifice 25, while air passage 24 is used to operate valve stem or needle 16 as will be discussed below. A liquid entry port 26 leads to liquid passage 22 to allow introduction of liquid into body 12. An air entry port 28 leads to air passage 24 to allow pressurized air to be introduced into passage 24. A second air passage 30 is provided in dispenser body 12 and communicates with another air entry port 32 for reasons to be discussed below. A liquid passage 34 and two air passages 36, 38 of a manifold 40 may respectively communicate with liquid entry port 26 and air entry ports 28 and 32 for supplying pressurized liquid and air to body 12. O-rings 42, 44, 46 are respectively disposed about ports 26, 28, 32 to seal these connections. Entry ports 26, 28 respectively have annular lips 48, 50 which interfere slightly with the inner diameter of O-rings 42, 44 for sealing with manifold 40. O-ring 46 is contained in a recess 52 by interfering slightly on its outer diameter with a wall 52*a* of recess 52.

As further shown in FIG. 2, a piston assembly 60 is disposed within body 12 and separates air passages 24 and 30. Piston assembly 60 specifically comprises glass impregnated PTFE discs 62, 64 (sold as Rulon type AR by Furon Company) sandwiched between two rigid metal discs 66, which may be crimped or otherwise secured together. Disc 68 preferably is crimped into rigid engagement with needle 16 by deforming a lower annular portion 70 thereof into a circumferential groove 72 contained in needle 16. Likewise, an upper annular crimped portion 74 is deformed into a circumferential groove 76 in needle 16. Finally, the upper portion of disc 68 is also deformed outwardly, as shown by crimped portion 78, into firm engagement with disc 66 to hold piston assembly 60 together. Pressurized air may be introduced through port 32 into passage 30 to move needle 16 against valve seat 14*a* and pressurized air may be introduced through port 28 into air passage 24 to move piston assembly 60 and needle 16 away from valve seat 14*a* during a liquid dispensing operation.

Figure 4:
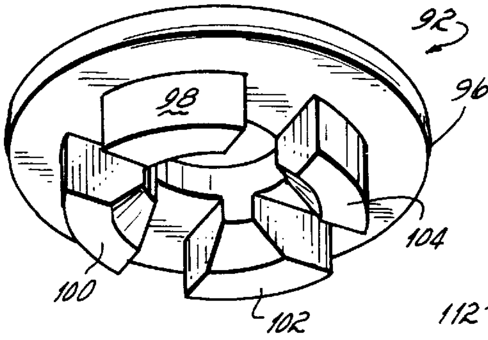
FIG. 4 is a perspective view of a force transfer element used in the preferred embodiment.

A spring return mechanism 90 is also preferably provided for maintaining needle 16 in a normally closed position against valve seat 14*a*. This may be considered a backup device to the introduction of pressurized air through port 32 and into passage 30 which will also maintain needle 16 in a closed position against valve seat 14*a*. Referring to both FIGS. 2 and 4, a force transfer element 92 is disposed between a spring 94 of spring return mechanism 90 and disc 66 of piston assembly 60. Force transfer element 92 includes a button 96 and legs 98, 100, 102, 104 extending from one side of button 96. Legs 98, 100, 102, 104 bear against disc 66. Through the provision of legs 98, 100, 102, 104, for example, pressurized air is allowed to pass through element 92 so that it does not tend to move due to pressurized air introduction into passage 30. A load screw 106 receives spring 94 and includes external threads 108 which engage internal threads 110 of a sleeve 112 secured to body 12 in a manner to be described. Preferably, load screw 106 is formed of 303 stainless steel and sleeve 112 is formed of brass. A lock nut 114 is threaded onto the outside of load screw 106 for allowing a spring adjustment to be locked in place. A machine screw 116 is preferably used to close a hole 117 within load screw 106. Hole 117 may be used to insert a probe into device 10, such as to determine whether needle 16 is operating correctly. An O-ring 118 is disposed between sleeve 112 and body 12 for retaining air pressure within passage 30.

Still referring to FIG. 2, a stroke length l is defined by the position of sleeve surface 120 relative to surface 122 of button 96. This stroke length l is maintained by a circumferential deformation or crimp 124 forced into body 12 and sleeve 112. It will be appreciated that other permanent or semi-permanent fixation methods may be used as well. When sufficient pressurized air is delivered to air passage 24, piston assembly 60 will carry needle 16 and, therefore, force transfer element 92 in a direction away from valve seat 14*a* and toward sleeve 112 until surface 122 contacts surface 124. This small distance l defines the distance that needle 16 will move away from valve seat 14*a*. In the preferred embodiment, this distance is approximately 0.018 inches. Of course, other stroke lengths may be used depending on the application requirements and/or the desired flow rate. The stroke length l may be easily and permanently set by moving needle 16 against valve seat 14*a* and sleeve 112 against force transfer element 92 and then allowing sleeve 112 to back out under the force of spring 94 until reaching the desired stroke length l. Then, sleeve 112 and body 12 are crimped together as shown at 124 to set stroke length l.

As further shown in FIG. 2, a seal nut 130 is disposed within body 12 and between air passage 24 and liquid passage 22 to seal these passages from one another. Tool engaging recesses 132 are provided on top of seal nut 130 to allow seat nut 130 to be turned within body 12 by way of respective threads 134, 136 on seal nut 130 and body 12. An O-ring 138 is disposed about seat nut 130 and engages the inside of body 12 as an additional manner of sealing between liquid passage 22 and air passage 24. An air seal 140 is disposed within a central recess 142 of seal nut 130. Air seal 140 includes a portion 144 formed from glass impregnated PTFE and an inner coil spring 146 for urging a lip 148 of portion 144 against needle 16. Air seal 140 receives needle 16 and generally retains pressurized air within air passage 24 during operation of device 10. As shown, air seal 140 may be retained in place by second needle guide 20. Second needle guide 20 includes a flange portion 20*a* disposed within a recess 150 contained in seal nut 130. Second needle guide 20 further includes weep holes 152 communicating with needle 16 for allowing escape of any liquid leaking from liquid passage 22 before such liquid reaches air passage 24.

Body 12 further includes fastener holes 154, 156 as shown in FIGS. 1 and 2. As further shown in FIG. 1, fastener holes 154, 156 are each preferably surrounded by O-rings 158, 160 for sealing purposes as against any suitable dispensing apparatus, such as a manifold 40 shown in FIG. 2. A surface 162 of second needle guide 20 acts as a fail safe surface with respect to one or more fasteners 164 disposed through fastener holes 154, 156. Thus, in one aspect of this invention, fasteners 164, due to their placement through body 12, act as stops in case of a failure due to excessive hydraulic pressure in liquid passage 22. Surface 162 of second needle guide 20 will move upwardly (as viewed in FIG. 2) only to the extent of fasteners 164 threaded into holes 166 in manifold 40, such as if threads 134, 136 strip or fail.

Figure 5:
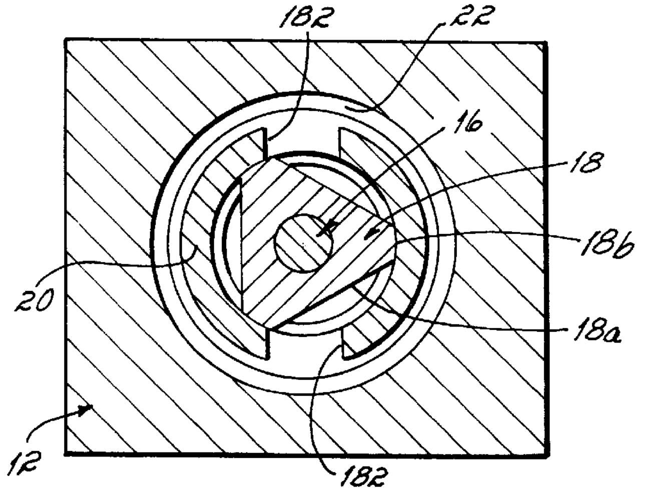
FIG. 5 is a cross-sectional view of the device generally taken along line 5—5 of FIG. 2.

As shown in FIGS. 2 and 5, a liquid seal 170 is disposed about needle 16 and within second needle guide 20. Liquid seal 170 has a generally "J"-shaped cross-section, like air seal 140, and includes an annular lip 172 bearing against needle 16. A coil spring 174 is contained within liquid seal 170 for supplying a radially directed inward force against lip 172 such that a sharp edge 176 thereof bears against needle 16. Importantly, sharp edge 176 of lip 172, as well as the contact area between lip 172 and needle 16, is generally disposed at the diameter of coil spring 174 as best shown in FIG. 5. This supplies optimum force and wiping action of lip 172 against needle 16. Preferably, seal 170 is formed from polyetheretherketone which may be machined with the optimally sharp edge 176.

Figure 6:
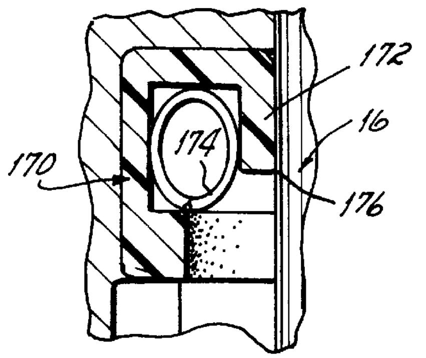
FIG. 6 is an enlarged view of encircled portion "6" of FIG. 2.

As shown further in FIG. 2, liquid seal 170 is contained within a space in second needle guide 20 by first needle guide 18. That is, three leg portions 178 of first needle guide 18 abut or reside close to liquid seal 170 after first needle guide 18 has been press fit into a receiving portion 180 of second needle guide 20. Receiving portion 180 may be cylindrical in shape. Receiving portion 180 includes a plurality of flow passages in the form of end slots 182, as shown in FIG. 6, such that a liquid flow path is provided through liquid passage 22 to valve seat element 14 and finally to orifice 25. Valve seat element 14 also includes a receiving portion 184, which may also be cylindrical. Receiving portion 184 holds first needle guide 18 with a friction fit or press fit. As further shown in FIGS. 2 and 3, respective seals, such as O-rings 186, 188 are contained on the outside of valve seat element 14 and second needle guide 20 for sealing liquid passage 22. Thus, it will be appreciated that valve seat element 14, first and second needle guides 18, 20, and O-rings 186, 188 may form a cartridge assembly as shown in FIG. 3 for replacement purposes or for use in a manifold dispensing device (not shown).

Referring briefly to FIG. 6, first needle guide 18 is generally triangular shaped in cross-section and includes three flat sides 18*a* and three apexes 18*b*. Apexes 18*b* are deliberately formed with a smaller width than the width of slots 182 to maintain a sufficient liquid flow path through slots 182 independent of the orientation of first needle guide 18 about the longitudinal axis of needle 16. The spaces between flat sides 18*a* and the internal walls of receiving portions 180, 184 (FIGS. 2 and 6) provide flow paths into valve seat element 14.

Figure 7:
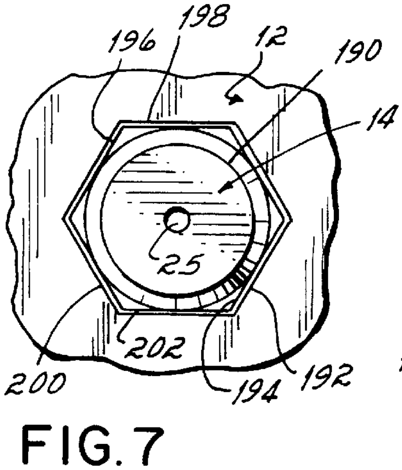
FIG. 7 is an end view of the device shown in FIG. 1 taken along line 7—7 thereof.

Valve seat element 14 may also include external threads 190 for allowing the attachment of a desired dispensing nozzle (not shown). In order that valve seat element 14 does not rotate when a dispensing nozzle is threaded onto threads 190, body 12 and valve seat element 14 include respective mating portions 192, 194. In the preferred embodiment, mating portions 192, 194 comprise multi-sided structures. As shown in FIG. 7, these multi-sided structures have mating flat surfaces 196, 198 contained, respectively, on a hole 200 in body 12 and a hex portion 202 of valve seat element 14. It will therefore be noted that valve seat element 14 may be easily inserted axially into hole 200 during assembly but will not rotate with respect to body 12 after assembly.

Figure 8:
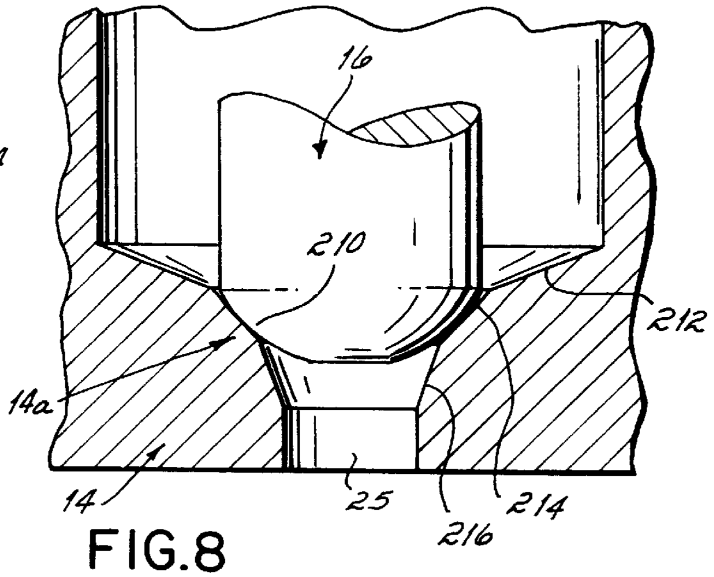
FIG. 8 is an enlarged view of the valve seat element and needle shown in FIG. 2.

As shown best in FIG. 8, needle 16 includes a rounded end 210 for engaging valve seat 14*a*. Valve seat 14*a* specifically comprises three successive frustoconical surfaces 212, 214, 216. Rounded end 210 of needle 16 preferably bears against frustoconical surface 214 of valve seat 14*a* when needle 16 is in a closed position.

Figure 2A:
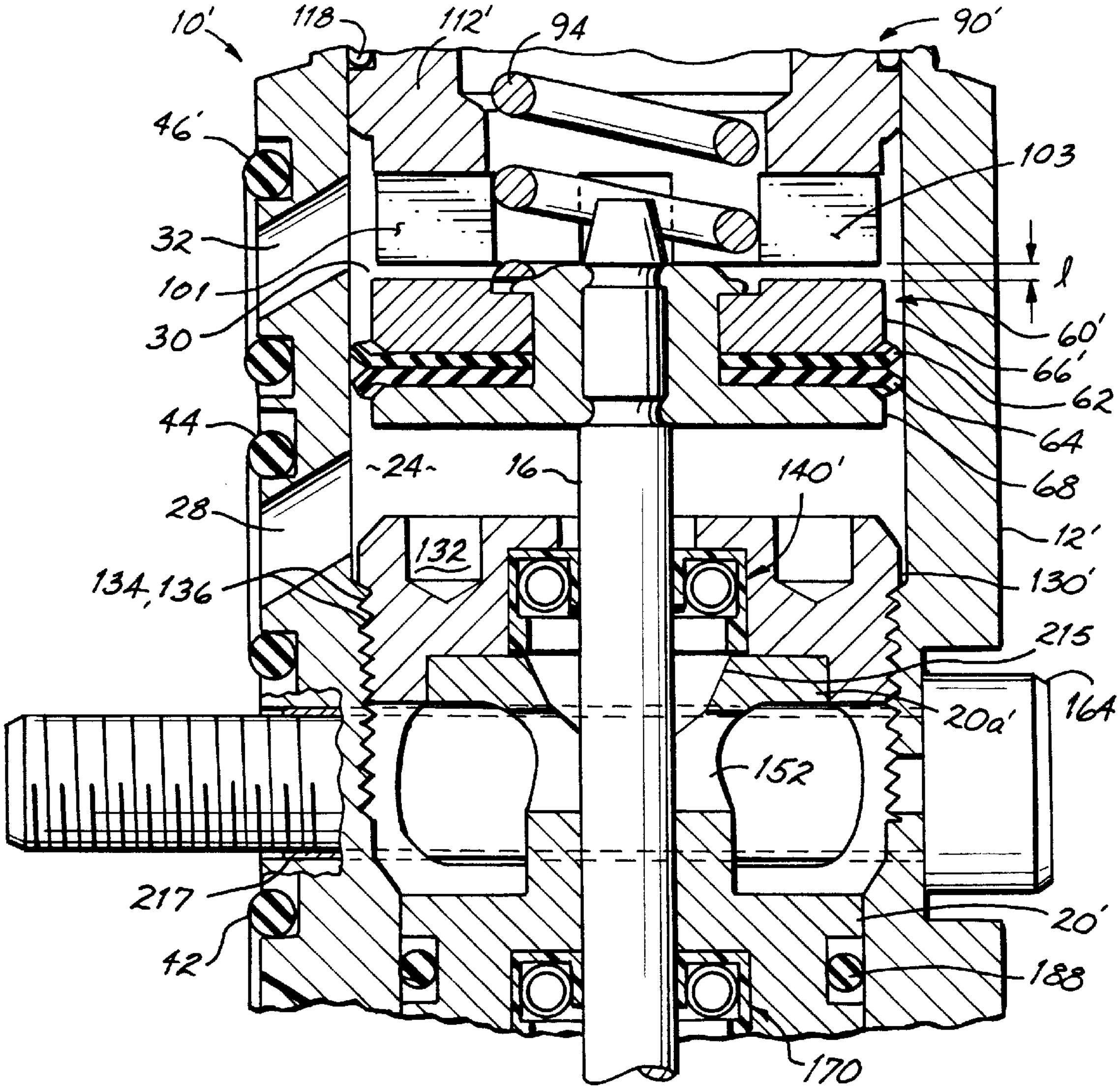
FIG. 2A is a fragmented sectional view similar to FIG. 2 but showing an alternative embodiment of this portion of the device.

One alternative device 10' is shown in FIG. 2A. Dispensing device 10' is essentially the same as dispensing device 10 shown in FIG. 2, however, certain modifications have been made to the portion of device 10' shown in FIG. 2A. Like reference numerals refer to like structure and function as between the two devices 10 and 10'. Therefore, a full discussion of the embodiment shown in FIG. 2A is not necessary. Reference numerals having prime marks (') refer to somewhat modified structure in the alternative embodiment as compared to elements having similar numerals in the preferred embodiment. One of the main differences between the embodiments shown in FIGS. 2 and 2A is that the force transfer element 92 of FIG. 2 has been eliminated and essentially merged or integrated into sleeve 112. In this regard, a sleeve 112' has been formed with legs 101, 103 (only two of four being shown) which create slots therebetween as with force transfer element 92 shown in FIG. 4. Thus, the stroke length "l" is formed between legs 101, 103 and piston assembly 60'. The upper piston element 66' has been somewhat modified into a larger flat disc for firm engagement with legs 101, 103 when needle 16 is in an opened position. Air port 32' has been made somewhat larger than air port 32 shown in FIG. 2. Also, an O-ring 46' has been disposed about port 32' in essentially the same manner as described with respect to O-rings 42, 44 of FIG. 2.

As also shown in FIG. 2A, air seal 140' has been modified from air seal 140 of FIG. 2 by utilizing another seal exactly as shown and described with respect to liquid or hydraulic seal 170. Air seal 140' is also oriented the same way as seal 170. O-ring 138 of seal nut 140 has also been eliminated as a conventional dry thread sealant (not shown) may alternatively be used on threads 134. The upper end of second needle guide 20' has been modified by including a generally conical shaped bore intersecting with needle 16. This bore allows material which is scraped from air seal 140' to fall into weep hole 152 through the resulting aperture created in flange 20*a*'. Finally, in lieu of O-rings 158, 160 (FIG. 1 ) used to seal fasteners 164, a stainless steel sleeve 217 has been press fit into each bore receiving a fastener 164. This prevents any liquid from entering the air passages within body 12' during installation onto manifold 40 (FIG. 2).

Figure 9:
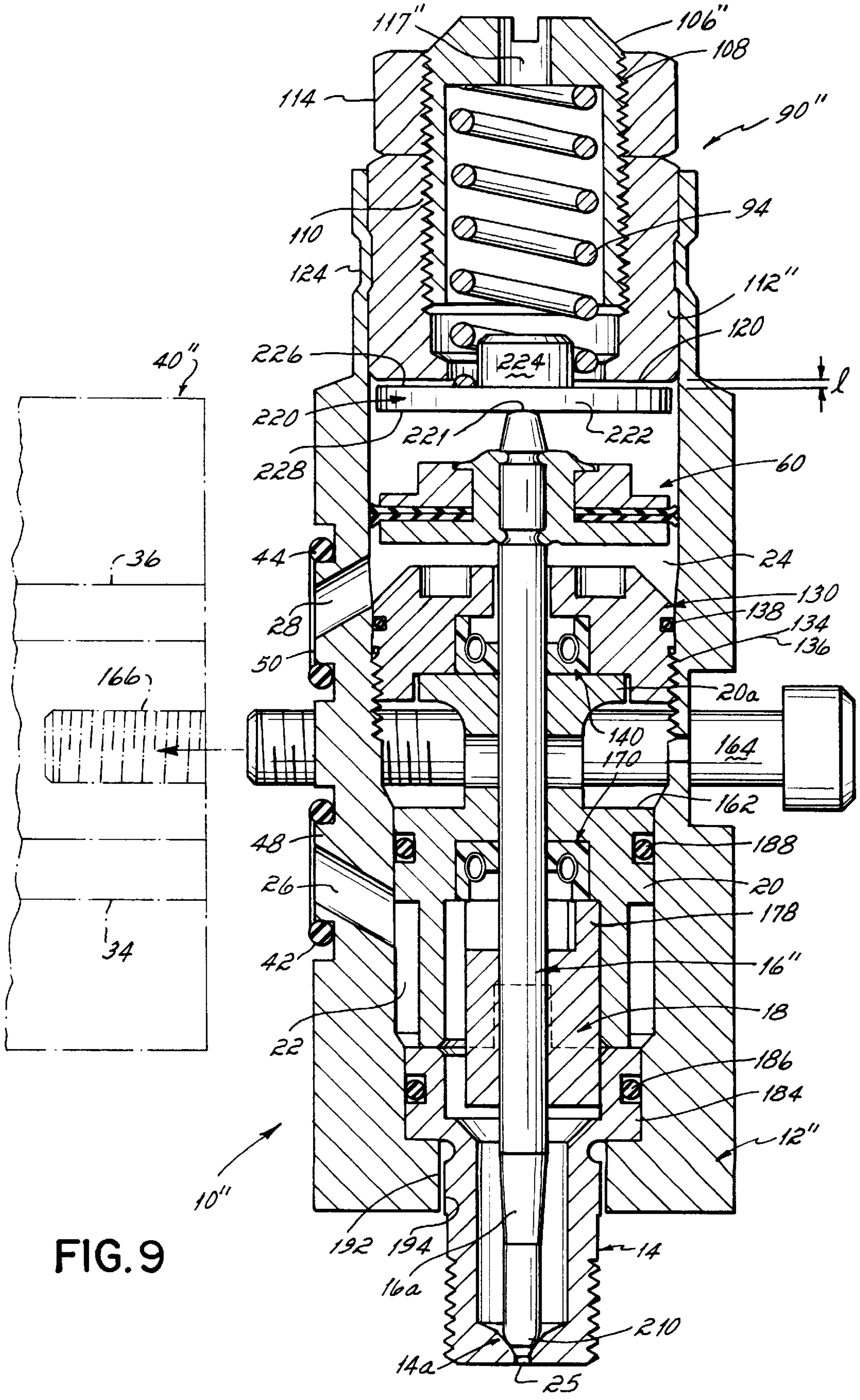
FIG. 9 is a cross sectional view similar to FIG. 2 but showing an alternative embodiment of the actuating section of the device.

Another alternative embodiment of dispensing device 10 is shown in FIG. 9 as a dispensing device 10". Dispensing device 10" is essentially the same as dispensing device 10 as shown in FIG. 2, however, certain modifications have been made to the valve actuating system. Like reference numerals refer to like structure and function as between the two devices. Therefore, a full discussion of the embodiment shown in FIG. 9 is not necessary. Reference numerals having double prime marks (") refer to somewhat modified structure in the alternative embodiment as compared to elements having similar numerals in the preferred embodiment. The essential difference between the two bodies 12 and 12" is that body 12" does not include second air entry port 32. Thus, the closing action of needle 16 is provided solely by spring return mechanism 90".

In the alternative embodiment of FIG. 9, a force transfer element is provided between spring 94 and needle 16 in the form of a needle load button 220 instead of force transfer element 92. Needle load button 220 bears against a rounded end 221 of needle 16 and transfers the force exerted by compression spring 94 along the longitudinal axis of needle 16. Needle load button 220 is not rigidly affixed to needle 16 but may pivot in any direction about end 221 and with respect to the longitudinal axis of needle 16. Needle load button 220 includes a flange 222 and a central protrusion 224. Protrusion 224 is received within spring 94 while flange 222 is adapted to contact surface 120" of sleeve 112" just as in the first embodiment. The stroke length l is also set between surface 120" and surface 226 of flange 222 just as described with respect to the first embodiment. An opposite surface 228 of flange 222 abuts rounded end 221 of needle 16 and is preferably a flat surface. In this way, the force of spring 94 is directed more along the longitudinal axis of needle 16 to help prevent sideward movement of needle 16. Needle load button 220 is preferably formed from 4140 heat treated steel.

It should be noted that the internal bores of body 12, 12' or 12" may all be formed in one machining setup. This is mainly due to the design of the central axial bore in body 12 which contains the spring return mechanism 90, 90' or 90", piston assembly 60 or 60', needle 16 or 16", seal nut 130, 130' or 130", first and second needle guides 18, 20 and valve seat element 14. The portions of the internal bore within body 12, 12' or 12" holding these parts becomes progressively smaller from one end of body 12, 12' or 12" to the other therefore allowing machining to be accomplished in one setup.

The operation of device 10, 10' or 10" will be apparent from a review of FIGS. 2, 2A and 9. Specifically, liquid is introduced under pressure into liquid entry port 26 such that it fills liquid passage 22 surrounding receiving portion 180 of second needle guide 20 and fills the space within receiving portion 180 by traveling through slots 182 and surrounding first needle guide 18. The liquid also moves into valve seat element 14. When sufficient air pressure is introduced into air entry port 28 and air passage 24, piston assembly 60 or 60" will move upwardly (e.g., as viewed in FIG. 2) thereby moving valve stem or needle 16 away from valve seat 14*a* and compressing spring 94. In the embodiments shown in FIGS. 2 and 2A, pressurized air directed through port 32 and into air passage 30 must at least be reduced and, preferably turned off, to allow this actuating movement of piston assembly 60 or 60' in an upward direction. Pressurized liquid contained in liquid passage 22 will then flow through orifice 25 and any attached nozzle or dispensing element (not shown).

When the pressurized air directed through port 28 is turned off or sufficiently reduced, spring 94 will force transfer element 92 (FIG. 2) or needle load button 220 (FIG. 9) to push piston assembly 60 (FIG. 2) or needle 16 (FIG. 9) to close needle 16 against valve seat 14*a* thus closing dispensing orifice 25. In the embodiment of FIG. 2A, air will flow through the slots between legs 101, 103 and thereby directly pressurized piston assembly 60'. It will be appreciated that, in the embodiments shown in FIGS. 2 and 2A, pressurized air may be directed through port 32 or 32' upon shut-off of air to port 28 to more quickly close needle 16. This may prevent stringing or drooling of adhesive from orifice 25 and generally provides for cleaner liquid cut-off in the embodiment of FIGS. 2 and 2A. In each of the various embodiments, first and second needle guides 18, 20 provide significant support against lateral or sideward movement of needle 16 during opening or closing of dispensing device 10, 10' or 10". This is particularly due to the presence of needle guide 18 which provides support for needle 16 or 16" essentially within liquid passage 22.

Although a specific description has been given for the preferred embodiment of this invention, those of ordinary skill in the art will readily recognize many modifications and substitutions that may be made in constructing the present invention without departing from the spirit or scope thereof. As only some examples, first needle guide 18 need not be shaped as shown in the preferred embodiment, and need not be connected to second needle guide 20 in the exact manner shown. Also, the flow path created by the first needle guide might be accomplished with structure other than the flat sides shown on the first needle guide 18, such as holes or recesses of some type. Other various modifications may be made including the substitution of elements among the various embodiments. In summary, the scope of the invention entitled to patent protection is not meant to be limited to the details described herein but is intended only to be guided by the scope of the appended claims.

What is claimed is:

1. A liquid dispensing device comprising:

a) a body having a liquid passage;

b) a valve seat element having a valve seat and a dispensing orifice communicating with the liquid passage, the valve seat element being operatively connected with the body;

c) a needle mounted for movement within the body to selectively allow and prevent liquid flow from the dispensing orifice;

d) a first needle guide connected to the valve seat element and having a guide portion receiving a first portion of the needle to inhibit sideward movement thereof, wherein the first needle guide is disposed within the liquid passage and is formed to allow flow of liquid to the dispensing orifice when the needle is moved away from the valve seat; and e) a second needle guide connected to the first needle guide and having a guide portion receiving a second portion of the needle to inhibit sideward movement thereof.

2. The device of claim 1 wherein a liquid flow path is formed adjacent an outer surface of the first needle guide.

3. The device of claim 2 wherein at least a portion of the outer surface of the first needle guide is discontinuous with respect to an adjacent inner surface of the second needle guide to form the liquid flow path and allow liquid to flow to the dispensing orifice.

4. The device of claim 3 wherein the second needle guide includes a receiving portion receiving the first needle guide, said receiving portion being circular in cross section and wherein the discontinuous outer surface portion of the first needle guide further comprises a flat outer surface.

5. The device of claim 4 wherein the first needle guide includes at least three of said flat outer surfaces and further includes at least three additional surfaces contacting a wall of said receiving portion.

6. The device of claim 1 wherein the first needle guide is connected with a friction fit to both the valve seat element and the second needle guide.

7. The device of claim 1 further including a liquid seal disposed around the needle adjacent to the guide portion of the second needle guide.

8. The device of claim 7 wherein a sharp edge portion of the liquid seal circumferentially bears against the needle and is formed from polyetheretherketone.

9. The device of claim 7 wherein the second needle guide includes at least one weep hole for receiving liquid leaking past the liquid seal.

10. The device of claim 7 wherein the first needle guide retains the liquid seal within a space in the second needle guide.

11. The device of claim 7 wherein the liquid seal is disposed between the guide portions of the first and second needle guides.

12. The device of claim 1 further including at least one mounting fastener disposed through the body and located with respect to the second needle guide to act as a failsafe stop for preventing movement of the second needle guide in a direction away from the valve seat element under excess liquid pressure.

13. The device of claim 1 wherein the valve seat element is removably attached to the body and at least one of the valve seat element and the body includes structure that inhibits rotation of the valve seat element with respect to the body but allows axial movement of the valve seat element into the body during assembly and disassembly.

14. The device of claim 13 wherein the body includes a multi-sided hole for receiving the valve seat element and the valve seat element includes a surface engaging the multi-sided hole to inhibit relative rotation between the valve seat element and the body.

15. The device of claim 1 further including an air passage containing a piston assembly connected with the needle and operative to move the needle when pressurized air is directed into the air passage.

16. The device of claim 1 further including a spring return mechanism operatively connected to an end of the needle by an element which is pivotal with respect to a longitudinal axis of the needle.

17. The device of claim 1, wherein the needle moves along an axis common to the valve seat and the first needle guide aligns the needle along said axis.

18. A liquid dispensing device comprising:

a) a body having a liquid passage;

b) a valve seat element having a valve seat and a dispensing orifice communicating with the liquid passage, the valve seat element being operatively connected with the body;

c) a needle having a longitudinal axis and mounted for movement within the body to selectively allow and prevent flow of liquid from the dispensing orifice;

d) a piston contained within an air passage in the body and connected to the needle;

e) a port communicating with the air passage to supply pressurized air in order to move the piston and needle to a closed position to prevent liquid flow from the dispensing orifice; and f) a spring return mechanism connected to the needle and including a spring for moving the needle to a closed position to prevent liquid flow from the dispensing orifice and including a force transfer element disposed between the spring and the piston for directing spring force along the longitudinal axis of the needle.

19. A liquid dispensing device comprising:

a) a body having a liquid passage;

b) a valve seat element having a valve seat and a dispensing orifice communicating with the liquid passage, the valve seat element being operatively connected with the body;

c) a needle having a longitudinal axis and mounted for movement within the body to selectively allow and prevent flow of liquid from the dispensing orifice; and d) a spring return mechanism connected to the needle for moving the needle to a closed position to prevent liquid flow from the dispensing orifice and including a force transfer element directing spring force along the longitudinal axis of the needle, wherein the force transfer element is pivotal with respect to the longitudinal axis of the needle.

20. The device of claim 19 wherein the spring return mechanism further includes a coil spring and the force transfer element further comprises a button element disposed between the spring and one end of the needle in a manner allowing pivoting motion of the button element about the end of the needle.

21. The device of claim 20 wherein the button element includes a portion protruding into the coil spring to retain the button element between the coil spring and the end of the needle.

22. The device of claim 20 wherein the end of the needle is rounded and a facing surface of the button element is flat.

23. The device of claim 19 wherein the needle further includes a piston and the body includes air passages communication with each side of the piston for moving the needle to open and closed positions under the force of pressurized air.

24. A cartridge assembly for use in a liquid dispensing device of a type in which a needle controls the flow of liquid from the device, the cartridge assembly comprising:

a) a valve seat element having a valve seat and a dispensing orifice;

b) a first needle guide connected to the valve seat element and having a guide portion for receiving a first portion of the needle to inhibit sideward movement thereof, the first needle guide being formed to allow flow of liquid to the dispensing orifice when the cartridge assembly is mounted in said device; and c) a second needle guide connected to the first needle guide and having a guide portion for receiving a second portion of the needle to inhibit sideward movement thereof.

25. The cartridge assembly of claim 24 wherein the first needle guide is formed to provide a liquid flow path adjacent an outer surface thereof.

26. The cartridge assembly of claim 25 wherein at least a portion of the outer surface of the first needle guide is discontinuous with an adjacent inner surface of the second needle guide to allow liquid to flow to the dispensing orifice.

27. The cartridge assembly of claim 25 wherein the second needle guide includes a receiving portion receiving the first needle guide, said receiving portion being circular in cross section and wherein the discontinuous outer surface portion of the first needle guide further comprises a flat outer surface.

28. The cartridge assembly of claim 27 wherein the first needle guide includes at least three of said flat outer surfaces and further includes at least three additional surfaces contacting a wall of said receiving portion.

29. The cartridge assembly of claim 24 further including a liquid seal disposed around the needle adjacent to the guide portion of the second needle guide.

30. The cartridge assembly of claim 29 wherein a lip portion of the liquid seal includes a sharp sealing edge and the lip portion is formed from polyetheretherketone.

31. The cartridge assembly of claim 29 wherein the second needle guide includes at least one weep hole for receiving liquid leaking past the liquid seal.

32. The cartridge assembly of claim 29 wherein the first needle guide retains the liquid seal within a space in the second needle guide.

33. The cartridge assembly of claim 29 wherein the liquid seal is disposed between the guide portions of the first and second needle guides.

34. The cartridge assembly of claim 24 wherein the first needle guide is connected with a friction fit to the valve seat element.

35. The cartridge assembly of claim 34 wherein the valve seat element receives at least a portion of the first needle guide with a friction fit.

36. The cartridge assembly of claim 35 wherein the second needle guide is connected with a friction fit to the first needle guide.

37. The cartridge assembly of claim 36 wherein the second needle guide receives a portion of the first needle guide with a friction fit.

38. The cartridge assembly of claim 24 wherein the second needle guide is connected with a friction fit to the first needle guide.

39. The cartridge assembly of claim 38 wherein the second needle guide receives at least a portion of the first needle guide.

40. A liquid dispensing device comprising:

a) a body having a liquid passage;

b) a needle having a longitudinal axis and mounted for movement within the liquid passage of the body to control liquid discharge from the body; and c) a valve seat element having a valve seat and a dispensing orifice communicating with the liquid passage in the body, wherein at least one of the valve seat element and the body includes structure that allows axial insertion of the valve seat element into the body but inhibits rotational movement of the valve seat element relative to the body.

41. The liquid dispensing device of claim 40 wherein the body includes an opening in one end and the valve seat includes a portion interfacing with the opening and having the structure that allows axial insertion of the valve seat element into the body but inhibits rotational movement of the valve seat element relative to the body.

42. The liquid dispensing device of claim 41 wherein said portion of the valve seat element is multi-sided and said hole in the body is multi-sided.

43. A liquid dispensing device comprising:

a) a body having a liquid passage;

b) a valve seat element having a valve seat and a dispensing orifice communicating with the liquid passage, the valve seat element being operatively connected with the body;

c) a needle having a longitudinal axis and mounted for movement within the body between open and closed positions to respectively allow and prevent flow of liquid from the dispensing orifice;

d) a piston contained within an air passage in the body and connected to the needle;

e) a port communicating with the air passage to supply pressurized air in order to move the piston and needle to a closed position to prevent liquid flow from the dispensing orifice; and f) a spring return mechanism connected to the needle and including a spring for moving the needle to a closed position to prevent liquid flow from the dispensing orifice and including a piston stop element against which the piston bears when the needle is in an open position and which allows air to flow therethrough from said port to said piston.

* * * * *